May 23, 1950 P. I. SEMAK 2,508,843
VALVE
Filed March 28, 1947 2 Sheets-Sheet 1
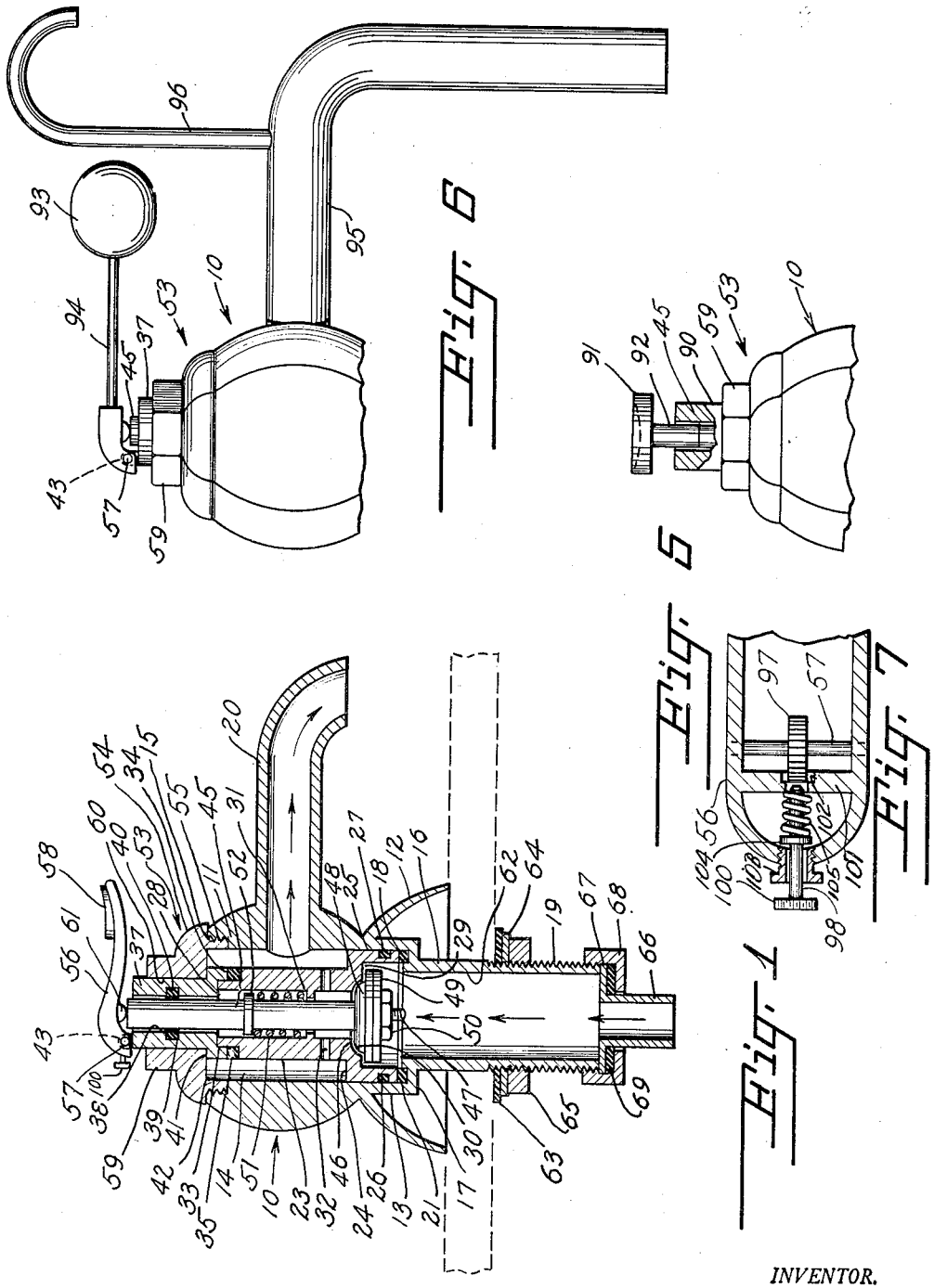
INVENTOR.
Peter I. Semak
BY
McMorrow, Berman & Davidson
Attorneys May 23, 1950 — P. I. SEMAK — 2,508,843
VALVE
Filed March 28, 1947 — 2 Sheets-Sheet 2
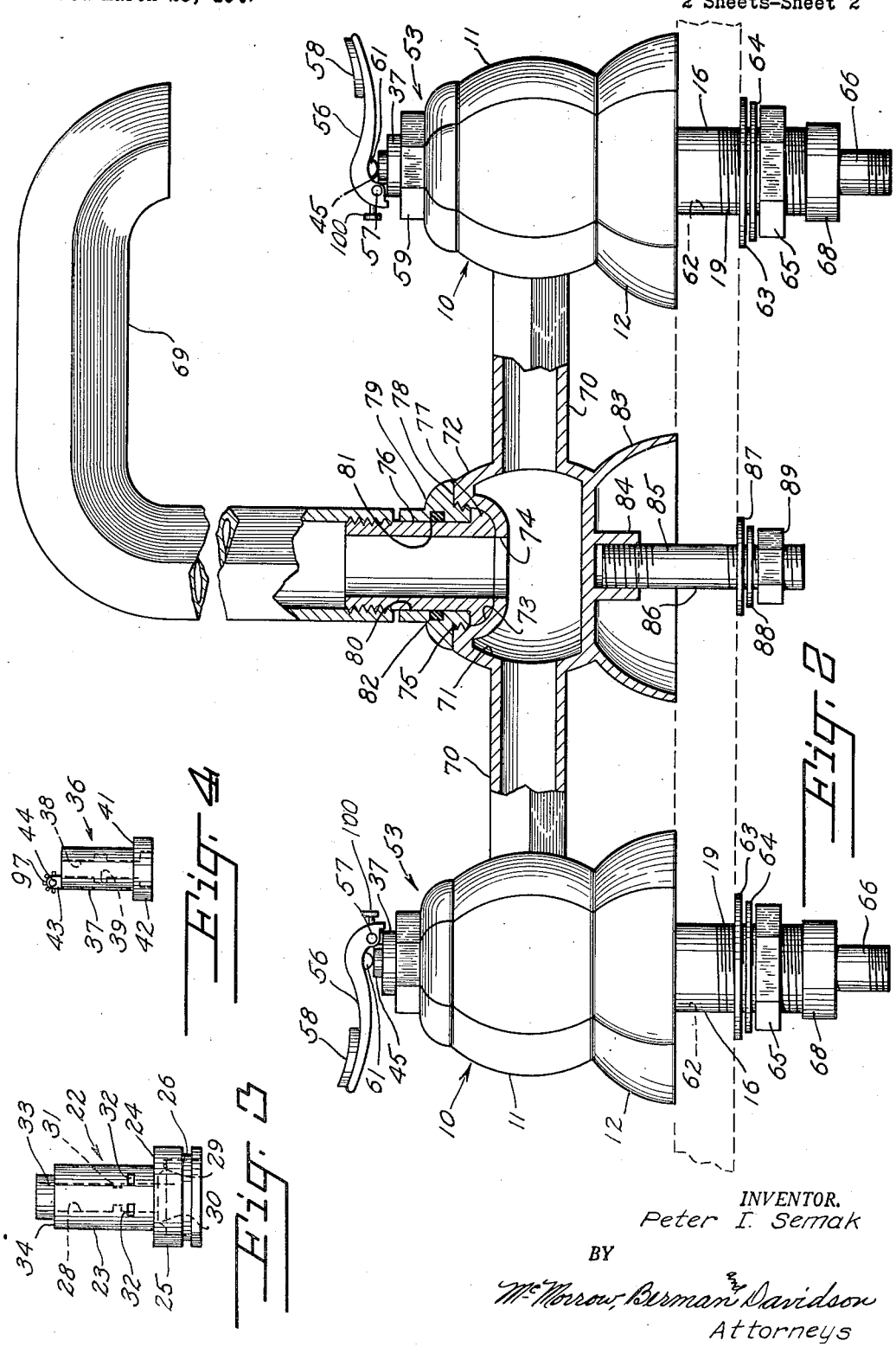
INVENTOR.
Peter I. Semak
BY
McMorrow, Berman & Davidson
Attorneys Patented May 23, 1950

2,508,843

UNITED STATES PATENT OFFICE 2,508,843

VALVE

Peter I. Semak, Castle Shannon, Pa.

Application March 28, 1947, Serial No. 737,850

7 Claims. (Cl. 251—134)

My invention relates to valves and more particularly to fluid dispensing valves.

The object of my invention is to provide a valve adapted to be used in connection with wash basins, bath tubs, drinking fountains, kitchen sinks, laundry tubs, beverage dispensing bars, flushing tanks and the like.

Another object of my invention is to provide a valve adapted to be opened easily and readily by a simple pressure on a lever, push button or the like and to close automatically.

A further object of my invention is to provide a valve adapted to be kept in drip-proof closed position under the pressure of the fluid to be dispensed when not opened manually.

A still further object of my invention is to provide a valve constructed in such a manner that it can not be left open accidentally, so that any waste of fluid to be dispensed is eliminated.

Other objects of my invention may appear in the following specification describing my invention with reference to the accompanying drawings illustrating a preferred embodiment of my invention.

It is, however, to be understood that my invention is not to be limited or restricted to the exact construction and combination of parts described in the specification and shown in the drawings, but that such changes and modifications can be made, which fall within the scope of the claims appended hereto.

In the drawings:

Figure 1 is a central vertical section through a spigot equipped with a valve according to my invention and secured to a wash basin or the like indicated in broken lines.

Figure 2 is an elevational front view of a mixing spigot equipped with valves according to my invention partly shown in section.

Figure 3 is an elevational side view of a plunger drum used in connection with the valve according to my invention.

Figure 4 is an elevational side view of a sealing bushing used in connection with a valve of my invention.

Figure 5 is a fragmentary elevational side view, partly shown in section, of a housing of a faucet equipped with a valve of the present invention, and Figure 6 is a fragmentary elevational side view of a valve according to my invention equipped with an attachment for use in a flushing tank or the like.

Figure 7 is a sectional detail view of a locking attachment adapted to secure the actuating lever in valve opening position, if desired.

Referring now in detail to the drawings and especially to the Figures 1, 2, 3 and 4, the valve forming the subject matter of my invention has a housing 10 preferably made as an integral casting and comprising a water jacket 11, on which a downwardly and outwardly extending bell-shaped flange 12 is formed serving as support for the entire construction on the surface of a wall, a wash basin, bath tube or the like. A cylindrical portion 13 extends straight downwardly inside the bell-shaped flange 12, and the water jacket 11 and the cylindrical portion 13 have a continuous smooth bore 14 therein.

At the upper end of the bore 14 a tapped counterbore 15 is provided for a purpose to be described later.

Co-axially with the cylindrical portion 13 a tubular portion 16 is formed on the casting 10, which has a smaller inside and outside diameter than the cylindrical portion 13. The circumferential shoulder 17 formed by the tubular and the cylindrical portions is located at a higher level than the bottom edge of the bell-shaped flange 12.

The upper end of the circumferential wall of the tubular portion 16 extends upwardly somewhat beyond the inner surface of the shoulder 17 forming an annular groove 18 with the circumferential wall of the cylindrical portion 13.

The lower part of the tubular portion is provided with an outer thread 19.

A spout 20 is formed on the water jacket 11 and extends horizontally and radially therefrom. The duct in the spout 20 communicates with the bore 14 of the water jacket 11.

A packing ring 21 made from rubber or any other suitable material is arranged in the groove 18 in the bottom of the bore 14.

A plunger drum 22 comprises a substantially cylindrical stem 23, on the lower end of which an outwardly extending circumferential shoulder 24 is formed by a straight downwardly extending tubular skirt 25 fitting snugly into the bore 14 of the water jacket 11 and the cylindrical portion 13.

The bottom edge of the skirt 25 engages the packing ring 21 in the groove 18 in the bottom of the bore 14.

In the circumferential outer surface of the skirt 25 a right angled circumferential groove 26 is provided, in which a packing ring 27, made from rubber or any other suitable material, is arranged.

The inner diameter of the tubular skirt 25 is somewhat bigger than the outside diameter of the cylindrical stem 23, in which a bore 28 is provided.

At the upper end of the bore of the tubular skirt 25 an inwardly extending circular shoulder 29 is formed connected by an upwardly and inwardly curved wall portion 30 with the bore 28.

An inwardly extending annular stop shoulder 31 is formed inside the bore 28 in the stem 23 and two or more transverse holes 32 are provided in the stem 23. These holes run parallel to each other and are located somewhat above the shoulder 24 and at equal distances from the vertical center plane of the plunger drum running parallel to the holes.

The upper end 33 of the stem 23 has a smaller diameter than the main portion of said stem, so that a circumferential shoulder 34 is formed on the stem. A packing ring 35 made from rubber or any other suitable material is positioned on this shoulder.

A sealing bushing 36 comprises a substantially cylindrical body 37 provided with a bore 38. In the inside surface of the body 37 an annular groove 39 is arranged adapted to receive a packing ring 40 made from rubber or any other suitable material. At the lower end of the cylindrical body 37 an outwardly extending shoulder 41 is formed, from which a short round skirt 42 extends downwardly. The inner diameter of this skirt is such that the reduced upper end 33 of the plunger drum stem 23 fits snugly in the skirt 42 and the outside diameter of the short skirt 42 is equal to the outside diameter of the main portion of said stem 23. The under surface of the skirt 42 engages the packing ring 35 located on the shoulder 34 on the stem 23.

A lug 43 provided with a horizontal hole 44 extends upwardly from the cylindrical body 37 for a purpose to be described later.

A plunger rod 45 has a plunger head 46 mounted on its lower end. The head is shaped to fit tightly onto the curved wall portion 30. A threaded nipple 47 is formed centrally on the lower end of the plunger 45 by reducing the latter to a smaller diameter. The plunger head 46, a rubber washer 48 and a metal washer 49 are mounted on the threaded nipple 47 and secured thereon by a nut 50.

The above described parts are assembled as follows:

In the bore 28 of the plunger drum stem 23 a helical spring 51 is inserted and rests with its lower end on the stop shoulder 31 in said bore. The plunger rod is inserted in the plunger drum stem bore 28 and through the helical spring 51, so that a circumferential stop shoulder 52 on the plunger rod engages the top end of the helical spring 51. The plunger head 46, the rubber washer 48 and the metal washer 49 are mounted on the threaded nipple 47 by the nut 50 so that the plunger head engages the curved wall portion 30 and the rubber washer 48 engages the circular shoulder 29 under the pressure of the spring 51 urging the plunger construction upwardly.

The packing ring 35 is arranged on the upper shoulder 34 on the plunger drum stem 23 and the packing ring 40 is placed into the annular groove 39 in the bore of the sealing bushing 36. This bushing is forced onto the upper end of the plunger rod 45 until the bottom edge of the short skirt 42 engages the packing ring 35.

The packing ring 27 is put into the circumferential groove 26 in the skirt 25 of the plunger drum 22 and the packing ring 21 is located in the ring groove 18 in the housing 10.

The assembled plunger construction is inserted into the bore 14 of the housing 10 and forced downwardly until the lower rim of the skirt 25 of the plunger drum 22 engages the packing ring 21 in the housing 10.

A housing cap 53 has a body 54, from which an outwardly threaded skirt 55 extends downwardly and is adapted to engage the tapped counterbore 15 in the housing 10. When the housing cap 53 is screwed down into the housing 10 the housing cap body 54 engages the shoulder 41 on the sealing bushing 36 securing the plunger assembly in the housing.

A lever 56 is pivotally connected with the lug 43 on the sealing bushing 36 by means of a pintle 57 extending through the lever adjacent one end thereof and through the hole 44 in the lug 43. The other end of the lever 56 may be equipped with a plate 58 adapted to be marked to indicate if the spigot dispenses hot or cold water.

To facilitate the attachment or detachment of the cap 53 on or from the housing 10 a hexagon boss 59 is formed on top of said cap. This boss is provided with a bore 60 to permit the cylindrical body 37 of the sealing bushing 36 to extend slidably therethrough.

The upper end of the plunger rod 45 extends a short distance above the upper end of the sealing bushing and a semi-globular lug 61 is formed on the underside of the lever 56 and rests on top of the upper end of the plunger rod 45.

The tabular portion 16 of the housing 10 extends through a hole 62 provided in the wall 63 or the top of a wash basin or the like, so that the bell-shaped flange 12 rests on said wall. A rubber washer 63 and a metal washer 64 are mounted on the tubular portion 17 at the other side of the wall and a nut 65 secures the entire valve construction on said wall by forcing the two washers against it.

A reducing nipple 66 has an outwardly extending flange 67 fitting against the end of the tubular portion 16 and a cap nut 68, in which a rubber washer 69 is arranged secures the reducing nipple to said tubular portion.

The above description shows clearly that the plunger head normally closes the valve tightly by being forced onto its seat by the spring 51 and the pressure of the water line, to which the reducing nipple 66 may be secured with its reduced end. A slight pressure with the tip of a finger on the free end of the lever 56 suffices to open the valve, which closes automatically and instantly upon releasing the lever 56.

If it is desired to keep the water running for a length of time, a wheel 97 is rigidly mounted on the pintle 57 inside the hollow lever 56 and is provided in its circumferential surface with transverse slots. Rearward of the pintle a cross wall 101 is arranged in the handle 56 having a centrally located opening 102 therein. In the rear wall of the lever 56 a screw bushing 103 is threadedly secured and a lock pin 98 extends slidably through said bushing and the hole 102. A flange 104 on the pin 98 is located inside the lever below the bushing 103 and a helical spring 105 surrounding the pin between the flange 104 and the cross wall 101 urges the pin outwardly. A knob 100 is formed on the outer end of the pin, which is forced inwardly into engagement with one of the transverse slots in the wheel 97 to secure the handle in valve opening position. When the pin is pulled outwardly the handle permits the valve to close.

In Figure 2 two valves of the kind and construction described above have been shown as adapted and arranged to feed a mixing spout 69.

In this case the two valve housings are provided with horizontal outlet pipes 70 instead of spouts 20. The outlet pipes 70 communicate with a mixing chamber 71 arranged in the mixing body 72. The top of body 72 has a centrally located depressing portion 73 provided with central hole 74 therein. The upper portion of the wall surrounding the depression is provided with a female thread 75.

A special nipple 76 has at its lower end an outwardly extending flange 77 fitting snugly in the depression 73 and forming a shoulder 78 on the special nipple 76.

A cap clamp 79 has a bore 80 fitting slidably over the special nipple 76 and is adapted to engage the female thread 75 in the body 72 and to abut the shoulder 78 on special nipple 76. In the inner circumferential surface of the cap clamp 79 an annular groove 81 is provided adapted to secure a packing ring 82 made from rubber or any other suitable material.

The upper end of the special nipple 76 is threaded outwardly and the mixing spout 69 is securely threaded onto this end.

By the above described construction the nipple 76 and the spout 69 are adapted to be swung in any desired position about the axis of the nipple.

On the bottom of the mixing housing 72 a downwardly extending bell-shaped flange 83 is formed adapted to rest on the outer or upper surface of the wall of a wash basin or the like.

Centrally of said flange 83 a downwardly extending tapped nipple 84 is formed on the bottom of the mixing housing 72. A bolt 85 is screwed into this nipple 84 and extends through a hole 86 in the basin wall.

A rubber washer 87, a metal washer 88 and a nut 89 on the bolt 86 at the inner side of the basin wall secure the mixing chamber etc. in position.

Figure 5 illustrates a modification of the valve described above. In general, the construction of the modified valve is the same as described, but the cylindrical body 90 of the sealing bushing of the modified form is longer than the cylindrical body 37, so that it extends beyond the upper end of the plunger rod 45, and the hinge lug 43 is omitted. A push button 91 has a downwardly extending push rod 92 adapted to fit slidably into the bore of the sealing bushing and to rest on the top end of the plunger rod 45, so that the valve can be opened by a slight downward push on the push button.

To adapt the valve according to my invention for use in connection with a flush tank (not shown) a float 93 is provided with a float stem 94, which is pivotally secured to the lug 43 by a pintle 57. The stem 94 is provided with the semi-globular lug 61 resting on top of the upper end of the plunger rod 45.

Instead of the common spout 20 the valve housing 10 is provided with an outwardly and downwardly extending angular outlet tube 95 leading to the tank (not shown). An upwardly extending narrow tube 96 communicating with the horizontal portion of the outlet tube 95 leads to the overflow of the tank.

Having described my invention, I claim as new and desire to secure by Letters Patent:

1. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, a plunger head removably secured on the lower end of the plunger rod, the helical spring engaging the flange on the plunger rod and urging the plunger head into closing position onto the valve seat, a bushing supported upon the upper end of said hollow cylindrical stem and extending upwardly about the upper end of said plunger stem and slidably engaging the latter, and a screw cap threadedly engaging in the tapped counter-bore of the housing and being disposed in effective position to retain said bushing down upon said hollow cylindrical stem and having a bore fitting about a portion of said bushing to center the latter.

2. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end.

3. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end, a hinge lug extending upwardly from the sealing bushing, the plunger rod extending upwardly beyond the bushing, a lever pivotally connected with the hinge lug and a downwardly extending lug on the lever engaging the top end of the plunger rod.

4. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end, a hinge lug extending upwardly from the sealing bushing, the plunger rod extending upwardly beyond the bushing, a lever pivotally connected with the hinge lug and a downwardly extending lug on the lever engaging the top end of the plunger rod, a tubular downwardly extending housing portion adapted to be connected with a water line and communicating at its upper end with the bore of the drum skirt, a plurality of transverse holes in the drum stem connecting the bore of the stem with the bore of the housing and an outlet spout on the housing communicating with the bore thereof.

5. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end, a hinge lug extending upwardly from the sealing bushing, the plunger rod extending upwardly beyond the bushing, a lever pivotally connected with the hinge lub and a downwardly extending lug on the lever engaging the top end of the plunger rod, a tubular downwardly extending housing portion adapted to be connected with a water line and communicating at its upper end with the bore of the drum skirt, a plurality of transverse holes in the drum stem connecting the bore of the stem with the bore of the housing and an outlet spout on the housing communicating with the bore thereof, a float on the outer end of said lever, the outlet spout being angular extending horizontally and downwardly, and an overflow outlet pipe communicating with the horizontal spout portion.

6. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside the hollow stem, a helical spring located in the stem and resting on said stop, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end, a hinge lug extending upwardly from the sealing bushing, the plunger rod extending upwardly beyond the bushing, a lever pivotally connected with the hinge lug and a downwardly extending lug on the lever engaging the top end of the plunger rod, a tubular downwardly extending housing portion adapted to be connected with a water line and communicating at its upper end with the bore of the drum skirt, a plurality of transverse holes in the drum stem connecting the bore of the stem with the bore of the housing and an outlet spout on the housing communicating with the bore thereof, a bell-shaped downwardly extending flange on the housing and clamping means on the tubular housing portion for urging said bell-shaped flange into contact with a wall or the like.

7. A valve for dispensing liquids having a housing provided with a bore and a tapped counter-bore at the upper end of said bore including a plunger drum, comprising a drum skirt fitting snugly into the bore in the housing, a hollow cylindrical stem extending upwardly from said skirt, a valve seat formed by said skirt and said stem, an annular stop shoulder inside hollow stem, a helical spring located in the stem and resting on said top, a plunger rod extending through said stem and the spring, a circumferential flange on the plunger rod intermediate its ends, and a plunger head removably secured on the lower end of the plunger rod, the helical spring engaging the flange on the plunger rod and urging the plunger head into closing position onto the valve seat, the upper end of the cylindrical stem having a reduced outside diameter, a sealing bushing, a short downwardly extending skirt on the bushing adapted to receive the reduced stem end slidably therein, and a screw cap threadedly engaging the tapped counter-bore and urging the bushing skirt onto the reduced stem top end, a push button and a push rod extending downwardly from said button and adapted to enter the sealing bushing and to engage the top end of the plunger rod.

PETER I. SEMAK.

REFERENCES CITED

The following references are of record in the file of this patent:

UNITED STATES PATENTS

| Number | Name | Date |
| --- | --- | --- |
| 125,086 | Rowe | Mar. 26, 1872 |